United States Patent
Wilson, Jr. et al.

(10) Patent No.: US 7,522,181 B2
(45) Date of Patent: Apr. 21, 2009

(54) METHOD AND APPARATUS FOR VIDEOCONFERENCE INTERACTION WITH BLUETOOTH-ENABLED CELLULAR TELEPHONE

(75) Inventors: George D. Wilson, Jr., Austin, TX (US); Katharine D. Nogarede, Austin, TX (US); Charles Gregory Rousch, Austin, TX (US)

(73) Assignee: Polycom, Inc., Pleasanton, CA (US)

( * ) Notice: Subject to any disclaimer, the term of this patent is extended or adjusted under 35 U.S.C. 154(b) by 695 days.

(21) Appl. No.: 11/075,616

(22) Filed: Mar. 9, 2005

(65) Prior Publication Data

US 2006/0203083 A1 Sep. 14, 2006

(51) Int. Cl.
*H04N 7/15* (2006.01)
(52) U.S. Cl. .................. 348/14.02; 348/14.08
(58) Field of Classification Search ............. 348/14.02, 348/14.08, 14.01; 455/416, 426.1
See application file for complete search history.

(56) References Cited

U.S. PATENT DOCUMENTS

| 6,839,079 B2 * | 1/2005 | Barlow et al. ............ 348/14.02 |
| 2003/0044654 A1 * | 3/2003 | Holt .......................... 455/416 |
| 2003/0092433 A1 * | 5/2003 | Flannery .................... 455/416 |
| 2004/0207719 A1 * | 10/2004 | Tervo et al. ............... 348/14.02 |
| 2005/0130584 A1 * | 6/2005 | Dowling et al. ............ 455/3.06 |
| 2006/0038506 A1 * | 2/2006 | Rose et al. .................. 315/247 |
| 2007/0070178 A1 * | 3/2007 | Maghera .................. 348/14.02 |

* cited by examiner

*Primary Examiner*—Stella L Woo
(74) *Attorney, Agent, or Firm*—Wong, Cabello, Lutsch, Rutherford & Brucculeri, LLP

(57) ABSTRACT

A videoconferencing station is disclosed which includes apparatus for establishing a wireless Personal Area Network (PAN) in the immediate vicinity of the videoconferencing station. In one preferred embodiment, the PAN is a Bluetooth piconet. A Bluetooth-enabled cellular telephone may then be used to make an audio connection via the telephone network to a remote user not in a conference room equipped with a videoconferencing station. The remote user may thereby participate in at least the audio portion of the videoconference. Video portions of the conference may similarly be transmitted if video-enabled phones are used.

14 Claims, 2 Drawing Sheets

METHOD AND APPARATUS FOR VIDEOCONFERENCE INTERACTION WITH BLUETOOTH-ENABLED CELLULAR TELEPHONE

BACKGROUND OF THE INVENTION

1. Field of the Invention

This invention relates to videoconferencing. More particularly, it relates to the use of a wireless personal-area network and one or more cellular telephone systems to extend the audio and/or video portions of a conventional, landline videoconference.

2. Description of the Related Art

In response to the increasing complexity of connecting various electronic devices together, various wireless solutions have been proposed. In addition to cellular telephone standards such as GSM, CDMA, and TDMA, a system known as Cellular Digital Packet Data (CDPD) can be used to transmit data over analog cellular networks and Internet access over existing GSM networks can be accomplished with General Packet Radio Service (GPRS).

IEEE Standard 802.11b, commonly known as Wi-Fi, is used principally by systems which provide wireless Internet access up to about 150 feet indoors for laptop computers, Personal Digital Assistants (PDAs), cell phones and the like. Wi-Fi systems operate on a frequency of 2.4 GHz and data transfer speeds up to about 54 Mbps can be achieved.

A wireless technology known as Bluetooth has been proposed by a consortium of companies which include Ericsson, Nokia, Toshiba, Intel and IBM. Over 2000 companies have joined the Bluetooth Special Interest Group (SIG) and Bluetooth-enabled devices are beginning to appear in the marketplace. Bluetooth also operates in the unlicensed Industrial, Scientific & Medical (ISM) band at a nominal 2.4 GHz and achieves a range of about 10 meters using a 1 milliwatt transmitter. Data transfer speeds of about 720 Kbps are typical for Bluetooth wireless connections.

Bluetooth is a radio technology developed to deliver short-range wireless mobility. Bluetooth eliminates cables/wires/cords between devices, such as mobile phones and headsets, and provides services when devices are in close proximity to one another. Bluetooth facilitates fast, secure transmissions of both voice and data, even when the devices are not in line-of-sight.

More specifically, Bluetooth is a standard and a specification for small form-factor, low-cost, short range radio links between mobile PCs, mobile phones and other portable devices. Bluetooth devices can function in two modes—circuit switched and packet switched. Circuit switched mode is the most common mode for voice communications while packet switched is usually preferred for Internet data and higher bandwidth mobile communication systems.

A Bluetooth Personal Area Network (PAN or "piconet") has a master and up to seven slaves thereby permitting the interconnection of up to eight devices in a radius of 10 meters. In a process known as Device Discovery, the master seeks devices by broadcasting requests; those slaves which are in a "discoverable" state answer with their identification numbers. A data channel is divided into time slots 625 microseconds long. The master transmits in even time slots, slaves in odd time slots. Packets can be up to five time slots wide. Data in a packet can be up to 2745 bits in length. Currently two types of data transfer between devices are defined: SCO (synchronous connection oriented) and ACL (asynchronous connectionless). In a Bluetooth piconet, there can be up to three SCO links of 64,000 bits per second each. To avoid timing and collision problems, the SCO links use reserved slots set up by the master. Masters can support up to three SCO links with one, two or three slaves. Slots not reserved for SCO links can be used for ACL links. One master and slave can have a single ACL link. ACL is either point-to-point (master to one slave) or broadcast to all the slaves. ACL slaves can only transmit when requested by the master. Data encryption is available for those users and applications that require additional security.

Up to ten Bluetooth piconets can overlap to form a "scatternet" which can link up to 80 Bluetooth devices (79 transmission channels are employed by the Bluetooth protocol, a limit based on the frequency used.) Unlike conventional radio operator networks, a Bluetooth piconet does not require an access point and, unlike infrared communication (e.g., per the IRDA standard), Bluetooth does not require a line-of-sight connection.

Bluetooth profiles are published definitions of implementations of Bluetooth wireless technology for particular uses. Profiles are the "services" offered by a device. In order for two Bluetooth-enabled devices to interoperate to complete a user task, both devices must implement a common profile.

Bluetooth radio transmitters utilize a spread spectrum, frequency hopping, signal at up to 1600 hops per second. The signal hops among 79 frequencies at 1 MHz intervals to provide a high degree of interference immunity. Compared with other systems in the same frequency band, the Bluetooth radio hops faster and uses shorter packets. The frequency range in the United States is 2400 MHz to 2483.5 MHz. In some other countries, the frequency range is more restricted and only 23 1-MHz channels are available. In both systems a guard band is used at the lower and upper band edge. Ten different types of hopping sequences are defined—five for the 79-hop system and 5 for the 23-hop system. The individual hopping sequences include the page sequence and the page response sequence which are used in the page procedure.

The signal transmitted by the Bluetooth link may be either half-duplex or full-duplex. Full duplex links in a Bluetooth piconet can send data at more than 64 Kbps—a speed sufficient to accommodate several voice channels. A half-duplex link can be established with a data rate of 721 kilobits per second in one direction and 57.6 Kbps in the other. If a half-duplex link having the same speed in both directions is required, a link with 432.6 Kbps in each direction can be made.

Unlike many other wireless standards, the Bluetooth wireless specification includes both link layer and application layer definitions for product developers which supports data, voice and content-centric applications.

The Bluetooth protocol architecture is described in the Bluetooth specification (which is incorporated herein by reference). The Bluetooth specification may be described as a protocol stack with the Bluetooth Radio layer as its base. The radio layer defines the requirements for a Bluetooth transceiver operating in the 2.4 GHz ISM band. A transceiver that takes part in a power-controlled link must be able to measure its own receiver signal strength and determine if the transmitter on the other side of the link should increase or decrease its output power level. A receiver Signal Strength Indicator (RSSI) makes this possible. The instructions to alter the transmitter power are carried in the LMP link.

Above the radio layer in the Bluetooth stack is the Baseband layer which describes the specification of the Bluetooth Link Controller (LC) which carries out the baseband protocols and other low-level link routines. The Baseband is the physical layer of the Bluetooth stack. It manages physical channels and links apart from other services like error correction, data whitening, hop selection and Bluetooth security.

The baseband protocol is implemented as a Link Controller which works with the link manager for carrying out link level routines like link connection and power control. The baseband also manages asynchronous and synchronous links, handles packets and does paging and inquiry to access and inquire Bluetooth devices in the area. The baseband transceiver applies a time-division duplex (TDD) scheme (alternate transmit and receive). Therefore, apart from the different hopping frequency (frequency division), the time is also slotted.

Thirteen different packet types are defined for the baseband layer of the Bluetooth system. Each packet consists of three entities: the access code (68/72 bits), the header (54 bits), and the payload (0-2745 bits). Access codes are used for timing synchronization, offset compensation, paging and inquiry. The header contains information for packet acknowledgement, packet numbering for out-of-order packet reordering, flow control, slave address and error check for header. The packet payload can contain voice field, data field or both. If it has a data field, the payload will also contain a payload header.

A Bluetooth controller operates in two major states: Standby and Connection. There are seven sub-states which are used to add slaves or make connections in the piconet. These are page, page scan, inquiry, inquiry scan, master response, slave response and inquiry response.

The Standby state is the default low power state in the Bluetooth unit. Only the native clock is running and there is no interaction with other devices. In the Connection state, the master and slave can exchange packets, using the channel (master) access code and the master Bluetooth clock.

The Link Manager carries out link setup, authentication, link configuration and other protocols. It discovers other remote Link Managers and communicates with them via the Link Manager Protocol (LMP). To perform its service provider role, the Link Manager uses the services of the underlying Link Controller (LC).

The Link Manager Protocol essentially consists of a number of PDU (protocol Data Units), which are sent from one device to another, determined by the AM_ADDR in the packet header. Link Manager PDUs are always sent as single-slot packets and the payload header is therefore one byte.

When a connection has been established between two Bluetooth devices, the connection consists of an ACL link. One or more SCO links can then be established.

Each Bluetooth link has a timer that is used for link supervision. This timer is used to detect link loss caused by devices moving out of range, the power-down of a device, or other similar failure. An LMP procedure is used to set the value of the supervision timeout.

The Host Controller Interface (HCI) provides a command interface to the Baseband Link Controller and Link Manager and access to hardware status and control registers. It provides a uniform command method of accessing the Bluetooth baseband capabilities. The HCI Link commands provide the host with the ability to control the link layer connections to other Bluetooth devices. These commands allow the Link Manager to exchange LMP commands with remote Bluetooth devices.

The Logical Link Control and Adaptation Protocol (L2CAP) is above the Baseband Protocol in the Bluetooth stack and resides in the data link layer. It supports higher level protocol multiplexing, packet segmentation and reassembly, and the conveying of quality of service information. L2CAP permits higher level protocols and applications to transmit and receive L2CAP data packets up to 64 kilobytes in length. Both Synchronous Connection-Oriented (SCO) links and Asynchronous Connection-Less (ACL) links are supported. L2CAP is packet-based, but follows a communication model based on channels. A channel represents a data flow between L2CAP entities in remote devices. Channels may be connection-oriented or connectionless. L2CAP relies on the flow control mechanism provided by the Link Manager layer in the baseband.

The RFCOMM protocol provides emulation of RS-232 serial ports over the L2CAP protocol. Two device types exist that RFCOMM must accommodate: Type 1 devices (communication end points such as computer and printers); and, Type 2 devices (devices that are part of the communication segment such as modems). On Type 1 devices, some port drivers must provide flow control services as specified by the API they are emulation. For example, an application may request a particular flow control mechanism such as XON/XOFF or RTS/CTS and expect the port driver to handle the flow control. On Type 2 devices, the port driver may need to perform flow control on the non-RFCOMM part of the communication path—the physical RS-232 port.

The Service Discovery Protocol (SDP) provides a means for applications to discover which services are provided by or available through a Bluetooth device. It also allows applications to determine the characteristics of those available services. A specific Service Discovery protocol is required in the Bluetooth environment inasmuch as the set of services that are available changes dynamically based on the RF proximity of Bluetooth-enabled devices which may be in motion. SDP uses a request/response model wherein each transaction consists of one request protocol data unit (PDU) and one response PDU. Every SDP PDU consists of a PDU header followed by PDU-specific parameters. The header contains three fields: a PDU ID which identifies the type of PDU; a TransactionID field which uniquely identifies request PDU's thereby permitting the matching of response PDU's to request PDU's; and, a ParameterLength field that specifies the length (in bytes) of all parameters contained in the PDU.

SDP allows Bluetooth-enabled devices to discover what other Bluetooth-enabled devices have to offer in the way of services. The process of looking for any offered services is termed "browsing"; "searching" means looking for a specific service. In SDP, the mechanism for browsing for services is based on an attribute shared by all services classes called the BrowseGroupList attribute. The value of this attribute contains a list of Universally Unique Identifiers (UUID's). Each UUID represents a browse group with which a service may be associated for the purpose of browsing.

SUMMARY OF THE INVENTION

A videoconferencing station is equipped with a Bluetooth wireless connection system. A Bluetooth-enabled cellular telephone may then be used to establish a Personal Area Network with the videoconferencing station. In this way, a call placed by the Bluetooth cellular telephone can connect a remote user to at least the audio portions of the videoconference. Video signals may, in similar fashion, be sent to or received from a remote device which may be a [another] video-equipped cell phone.

BRIEF DESCRIPTION OF THE DRAWING FIGURES

DETAILED DESCRIPTION

Consider the following scenario: A videoconference is scheduled for 8:30 am in a conference room equipped with a videoconference station. One of the key participants in the conference has called from her cell phone to report that, due to an accident on the freeway, she is stuck in traffic and will not be able to get to the office in time to participate in the conference. If, however, a conference connection could be established with the person stuck in traffic via the cellular phone system, she could at least participate in the audio portion of the conference. Better yet, if a video-equipped cellular phone were available, at least selected video signals (if not full-motion video) could also be sent and/or received.

Using the methods of the prior art, the absent participant could join the conference by dialing into a bridge. However, this requires that a bridge with the proper connections be employed in the videoconference. A bridge may not be available and/or there may not be sufficient time to set up a bridge in order to accommodate participants without access to one of the pre-arranged videoconferencing stations.

The present invention provides a solution to this problem by providing a method and apparatus for establishing a wireless connection between a videoconferencing station and a nearby cellular telephone. The connected cellular telephone may then be used to establish a conventional connection to a telephone at a remote location via the cellular system (which may include a landline connection). The remote location may be a mobile location and the remote user may be another cellular user on the same or a different system.

One preferred method of establishing a wireless connection to a cell phone in the conference room is the Bluetooth system, as described above in the section entitled "Background of the Invention."

Figure 1:
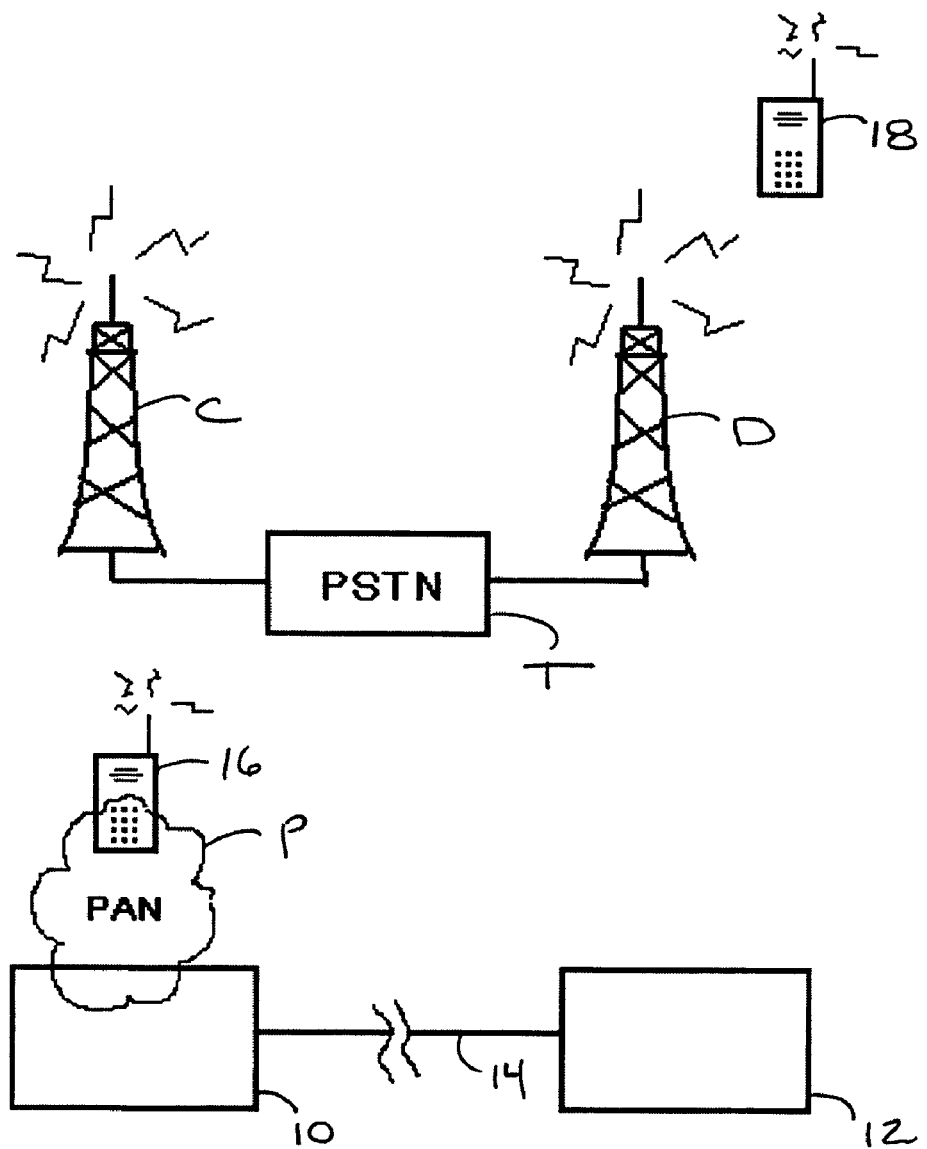
FIG. 1 is a block diagram of two linked videoconferencing stations one of which is participating in a wireless Personal Area Network with a cellular telephone.

Referring now to FIG. 1, there is depicted in block diagram form a first videoconferencing station 10 in data communication with a second videoconferencing station 12 at a remote location via broadband connection 14. Broadband connection 14 may comprise one or more ISDN lines using the H.320 protocol or may be a Local Area Network (LAN), a Wide Area Network (WAN) or the Internet using the H.323 protocol.

Videoconferencing station 10 is shown participating in a wireless Personal Area Network P with cellular telephone 16. Cellular telephone 16 may be a Bluetooth-enabled phone which is conferenced into videoconferencing station 10 using the Bluetooth protocol. In certain embodiments, videoconferencing station 10 may emulate a Bluetooth headset and may include one or more controls to mimic the controls used on a Bluetooth headset. In still other embodiments, videoconferencing station 10 may emulate the "handsfree" accessory of a Bluetooth-enabled phone. Cellular telephone 16 may be in wireless communication with cellular system C which is connected to the Public Switched Telephone Network T.

Using the telephone network, an audio connection to the videoconference may be made to any telephone. As shown in FIG. 1, the second telephone may be cellular telephone 18 which is in communication with cellular system D. In this way, the user of cellular phone 18 may participate in at least the audio portion of the videoconference without being physically present with either videoconference station 10 or videoconference station 12 and without having to dial into a bridge or a videoconferencing station acting as a bridge.

The audio portion of the videoconference is available from at least two sources: 1) the data communications channel; and, 2) the raw audio feed to the system. A serial transfer method allows audio data to be repacketized and sent over the network like any other data. Audio feedback is not a problem since cellular telephone 16 does not "hear" the audio coming from the videoconferencing system since its microphone is automatically muted by virtue of its being in headset or handsfree mode. [check]

If cell phones 16 and 18 are video phones, video portions of the videoconference may also be transmitted to the physically remote user of cell phone 18. The video frame rate would depend on the bandwidth of the connection.

Figure 2:
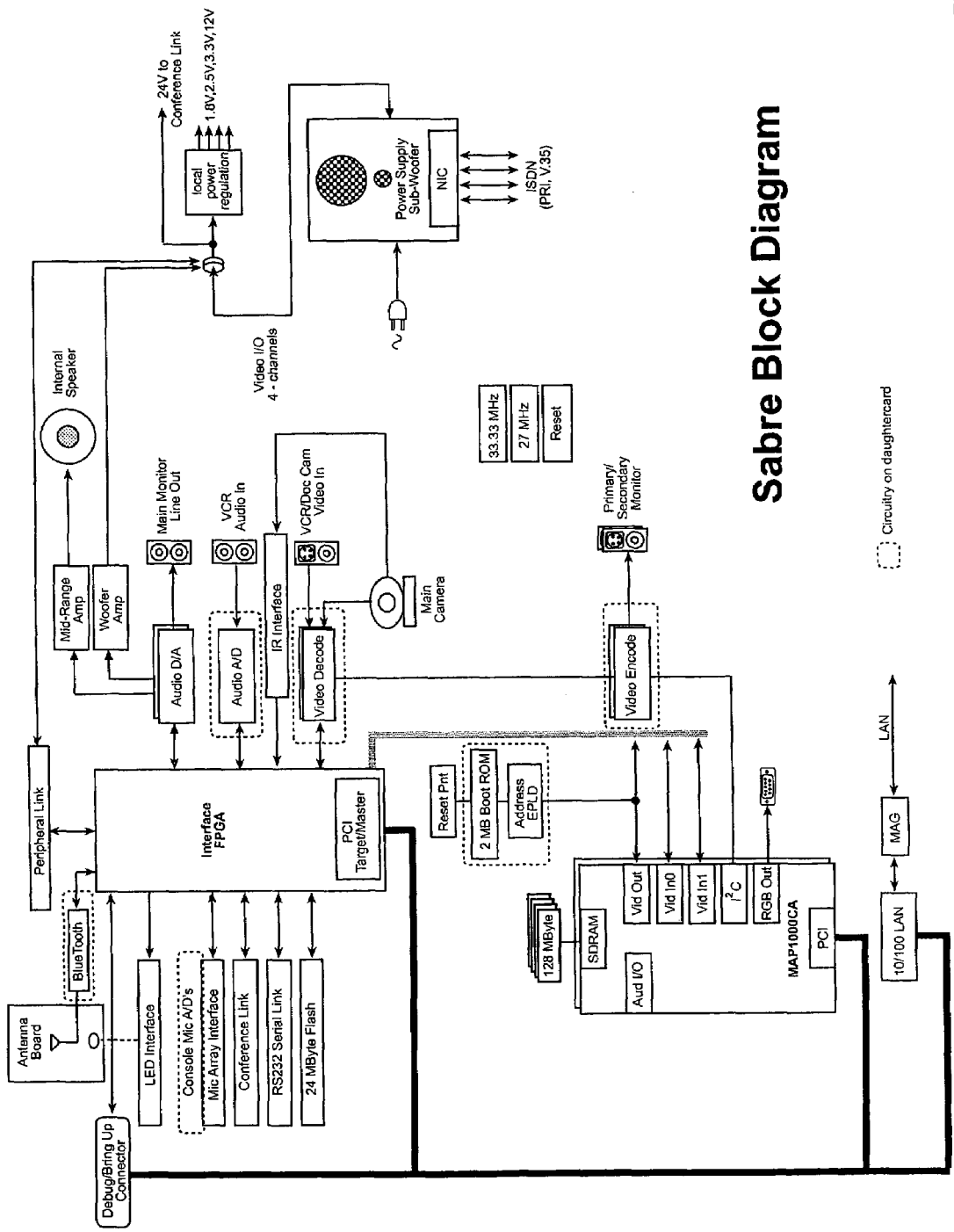
FIG. 2 is a block diagram of a Bluetooth-enabled videoconferencing station according to one embodiment of the present invention.

FIG. 2 shows the Bluetooth enabling of a videoconferencing station according to one embodiment of the invention. Videoconferencing station 10 comprises media processor 26 in data communication with an interface comprised of Field-Programmable Gate Array 24. Bluetooth module 20 is connected to antenna board 22 for RF communication and to interface 24 for data communication.

A Multi-Function or 'Answer/End' Button on the videoconferencing station may be used (optionally in conjunction with an indicator) to control various Bluetooth-related functions of the videoconferencing station including initiating, answering, transferring, and ending mobile calls. It may also be used for enabling and disabling the Bluetooth function of the videoconferencing station, as well as pairing the videoconferencing station to a Bluetooth phone.

By way of example, in one particular embodiment of the videoconferencing system, the following steps may be followed to enable the Bluetooth function:
1. Turn on the videoconferencing station.
2. Press and hold the Bluetooth multi-function button firmly for at least 3 seconds until the indicator light emits a very short burst of flashes and the speaker emits a quick series of tones in ascending order.
3. Without delay, release the button. An indicator light on the outside of the videoconferencing station will flash every 3 seconds while the videoconferencing station is on and the Bluetooth function is enabled. The videoconferencing station is now in Bluetooth 'standby' mode and ready for use.

Similarly, the following procedure may be followed to disable the Bluetooth function:
1. Press and hold the Bluetooth multi-function button firmly for at least 3 seconds until the indicator light emits a very short burst of flashes and the speaker emits a quick series of tones in descending order.
2. Without delay, release the button. The videoconferencing station Bluetooth function is now turned off (disabled). There is no indicator light activity in this mode.

Bluetooth Pairing

With a Bluetooth phone (or other device), it may be necessary to 'pair' the videoconferencing station with the particular phone before using this feature of the videoconferencing station for the first time. 'Pairing' creates a unique wireless link between two Bluetooth devices, eliminating the need to repeat the pairing process during future use. Pairing can prevent another (unwanted) Bluetooth-enabled phone from joining the PAN thereby ensuring the privacy of the call.

The pairing process may vary depending on the device with which one pairs the Bluetooth function. In certain embodiments of the invention, instructions for pairing may be displayed on the screen of the videoconferencing station. This process may include automatic on-screen display of pairing instructions in response to detection of a Bluetooth-enabled device by the videoconferencing station. In one particular embodiment, the user may reject the displayed instructions by command from a remote control whereupon the instructions are cleared from the display screen. The following section describes how to pair a Bluetooth-enabled videoconferencing station according to one embodiment of the present invention to a typical Bluetooth phone.

Pairing to a Bluetooth phone

The following is one example of a procedure used to pair a Bluetooth-enabled videoconferencing station with a Bluetooth phone:

1. Ensure that the Bluetooth function of the videoconferencing station is off (disabled).
2. Press and hold down the Bluetooth multi-function button for approximately 7 seconds until the videoconferencing station's Bluetooth indicator light turns on steadily.
3. While the light is still steadily lit, release the button. The indicator light will remain on, indicating that the Bluetooth function is in pairing mode and waiting to communicate with another Bluetooth pairing device.
4. The user may then follow the operating instructions for the Bluetooth-enabled mobile phone to start the pairing process. Typically, this is done by going to a 'setup' or 'connect' menu and then selecting the options to 'discover' Bluetooth devices. It may take several seconds to establish a connection.
5. The display on the mobile phone should indicate to the user that it found the videoconferencing station and may then ask whether the user wants to pair it. The user may then confirm this.
6. The phone's display may then prompt the user for a passkey or Personal Identification Number (PIN)—e.g., a sequence of four zeros: 0000.
7. To indicate that pairing has been successful, the videoconferencing station's Bluetooth indicator light may briefly flash rapidly before it goes back to flashing at the first rate (every 3 seconds) indicating standby mode.

Making a Call

Once the Bluetooth function of the videoconferencing station is in standby mode, there may be different ways to make a call. For example, a call may be initiated using the keypad on the mobile phone:

1. Using the phone's keypad, the user may dial the phone number of the remote participant.
2. The user may then press the phone's 'send' key—the phone initiates the call and transfers the audio from the phone to the videoconferencing station automatically.

Ending a Call

At least two methods may be used to end a call.

To end a call from the videoconferencing station—the user may press the videoconferencing station's Bluetooth multi-function button.

To end a call from the mobile phone—the user may depress the 'end' key on the phone's keypad or close the phone (if it is a flip-style or extensible phone).

An audio indication may be provided to the user upon the ending of a supplementary mobile call, e.g., a series of descending tones.

The indicator light on the videoconferencing station should also be flashing at the first rate (once every 3 seconds) indicating that the Bluetooth function of the videoconferencing station is in standby mode and that the mobile call to a remote participant has ended.

Answering a Call

Once the Bluetooth function of the videoconferencing station is in standby mode, it may allow the user to receive incoming calls without handling his or her mobile phone. During an incoming call, a ring tone may sound on the mobile phone, as usual. The user may also hear ring tones through the speaker of the videoconferencing station. When the user hears the tones, he or she may answer the incoming call by pressing the multi-function Bluetooth button on the videoconferencing station and speak normally.

The user may also answer the call by using the mobile phone's keypad. In this case one may subsequently transfer the audio to the videoconferencing station by following the instructions in the next section.

Transferring a Call

To transfer a call from the phone to the videoconferencing station, the user may briefly press the videoconferencing station's Bluetooth multi-function button.

To transfer a call from the videoconferencing station to the phone, the user may turn the videoconferencing station off. Some phones may require the user to complete the transfer using the phone's keypad.

Call-Waiting

Some phones allow the user to accept another incoming call while he or she is using the Bluetooth function. This feature varies by mobile service provider and phone model. If the user normally hears a beep, he or she may still hear this beep through the videoconferencing station. If the mobile phone service supports this feature, the user can use either the mobile phone's keypad or the videoconferencing station. To use the mobile phone's keypad, the user can switch between calls using the standard method as specified by the mobile phone's manufacturer. To use the videoconferencing station to switch between calls, the user may briefly press the Bluetooth function button once. As with the mobile phone controls, one may then return to the initial call by briefly pressing the button once more.

The videoconferencing station may be provided with a Bluetooth function indicator to show pairing and calling status. For example, the function indicator may be a light on the exterior of the videoconferencing station. In the particular embodiment shown in FIG. 2, the Bluetooth function indicator comprises LED 28 which is powered and controlled by LED Interface 30. The Bluetooth Disabled status may be indicated by having the indicator off. The Standby state (i.e., ready for call) may be indicated by having the indicator flash at a first rate (e.g., once every 3 seconds). The Active state (call in progress) may be indicated by having the indicator flash at a second rate (e.g., once every second). The selection of Pairing Mode may be signaled by having the indicator on steadily. And, Successful Pairing may be indicated with a brief series of rapid flashes after pairing mode is signaled.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method of making a remote audio connection to a videoconference comprising:

establishing a wireless Personal Area Network comprising a first videoconferencing station and a first cellular telephone;

establishing a videoconference connection between the first videoconferencing station and a second videoconferencing station at a remote location;

connecting the first cellular telephone to a second telephone via a telephone network;

transmitting videoconference audio signals to and from the second telephone via the Personal Area Network, first cellular telephone and the telephone network.

2. A method as recited in claim 1 wherein the second telephone is a cellular telephone.

3. A method as recited in claim 1 wherein the telephone network comprises the Public Switched Telephone Network.

4. A method as recited in claim 1 wherein the telephone network comprises a plurality of cellular telephone systems.

5. A method as recited in claim 1 wherein the wireless Personal Area Network is a Bluetooth piconet.

6. A method as recited in claim 1 further comprising transmitting selected videoconference video signals to the second telephone.

7. A method as recited in claim 1 further comprising pairing the first videoconferencing station and the first cellular telephone.

8. A processor-controlled videoconferencing station comprising:

a radio-frequency Personal Area Network interface in data communication with the processor; and, a medium storing instructions for causing the processor to:
establish a radio-frequency Personal Area Network comprising the videoconferencing station and a first cellular telephone;

establish a videoconference connection between the videoconferencing station and a second videoconferencing station at a remote location;

connect the first cellular telephone to a second telephone via a telephone network; and, transmit videoconference audio signals to and from the second telephone via the Personal Area Network, first cellular telephone and the telephone network.

9. A processor-controlled videoconferencing station as recited in claim 8 further comprising a push button for controlling the radio-frequency Personal Area Network interface and means responsive to the push button for enabling and disabling the Personal Area Network interface.

10. A processor-controlled videoconferencing station as recited in claim 9 further comprising means responsive to the push button for pairing the videoconferencing station with a cellular telephone having a compatible Personal Area Network interface.

11. A processor-controlled videoconferencing station as recited in claim 8 further comprising an indicator light for indicating the state of the Personal Area Network.

12. A videoconferencing station as recited in claim 11 wherein the indicator light indicates the state of the Personal Area Network by flashing at different rates.

13. A processor-controlled videoconferencing station comprising:

a radio-frequency Personal Area Network interface in data communication with the processor; and, a medium storing instructions for causing the processor to:
display on a display device instructions for pairing a cellular telephone to the videoconferencing station via a radio-frequency Personal Area Network;

establish a radio-frequency Personal Area Network comprising the videoconferencing station and a first cellular telephone;

pair the videoconferencing station and the first cellular telephone in response to commands from a videoconferencing station user;

establish a videoconference connection between the videoconferencing station and a second videoconferencing station at a remote location;

connect the first cellular telephone to a second telephone via a telephone network; and, transmit videoconference audio signals to and from the second telephone via the Personal Area Network, first cellular telephone and the telephone network.

14. A videoconferencing station as recited in claim 13 wherein the instructions for pairing a cellular telephone to the videoconferencing station are displayed in response to detection of a radio-frequency Personal Area Network signal.

* * * * *